July 10, 1956 G. B. KLEE 2,753,902
SCREW ACTUATED RECTANGULAR FRAME WORK CLAMP
Filed Jan. 19, 1953 3 Sheets-Sheet 1
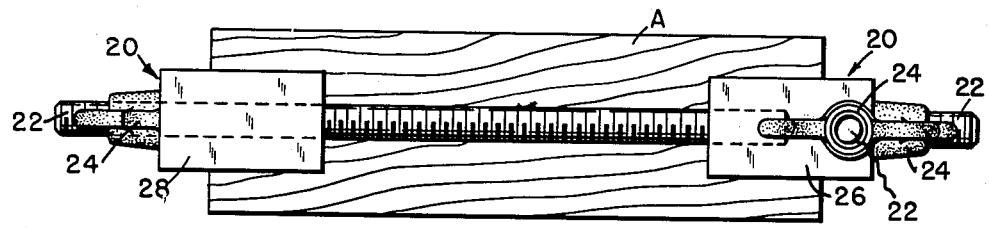
FIG. 9
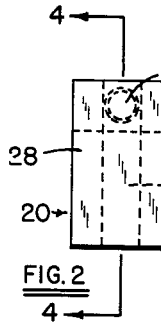
FIG. 2
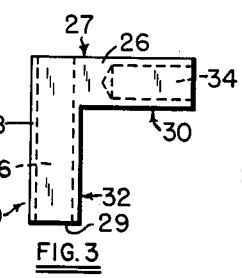
FIG. 3
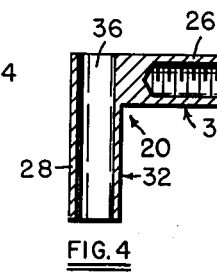
FIG. 4
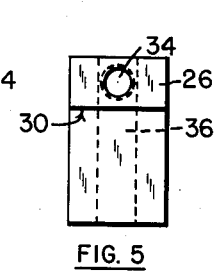
FIG. 5
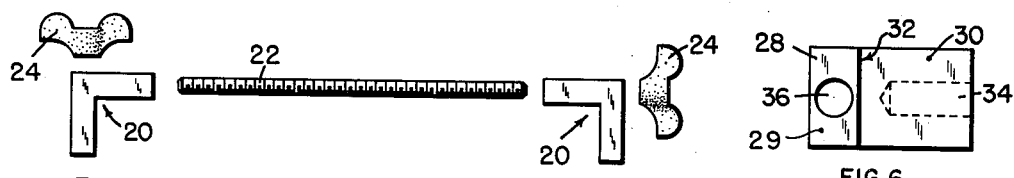
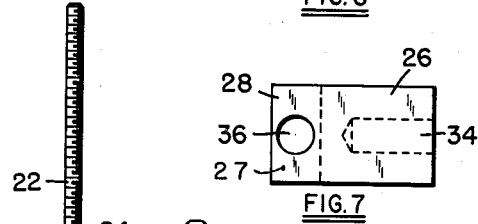
FIG. 6
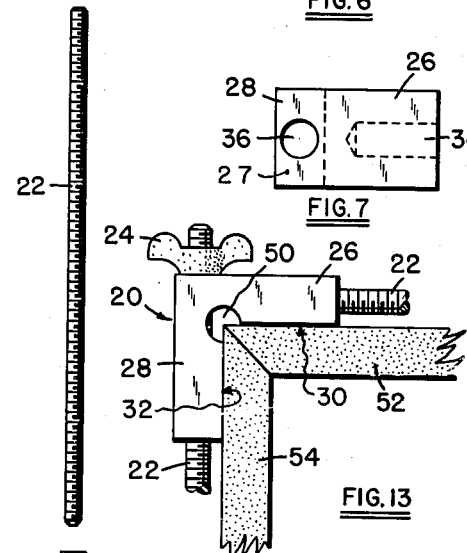
FIG. 7
FIG. 13
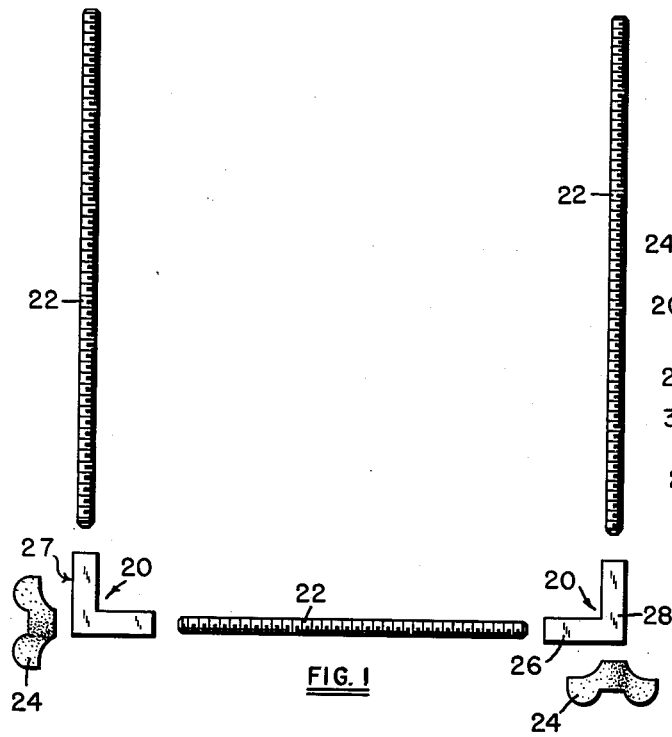
FIG. 1
*INVENTOR.*
GEORGE B. KLEE
BY
J. Warren Kinney, Jr.
ATTORNEY July 10, 1956    G. B. KLEE    2,753,902
SCREW ACTUATED RECTANGULAR FRAME WORK CLAMP
Filed Jan. 19, 1953    3 Sheets-Sheet 2

INVENTOR.
GEORGE B. KLEE
BY
J. Warren Kinney, Jr.
ATTORNEY

July 10, 1956  G. B. KLEE  2,753,902
SCREW ACTUATED RECTANGULAR FRAME WORK CLAMP
Filed Jan. 19, 1953  3 Sheets-Sheet 3

*INVENTOR.*
GEORGE B. KLEE
BY
J. Warren Kinney, Jr.
ATTORNEY

United States Patent Office 2,753,902
Patented July 10, 1956

2,753,902

SCREW ACTUATED RECTANGULAR FRAME WORK CLAMP

George B. Klee, Cincinnati, Ohio

Application January 19, 1953, Serial No. 331,949

1 Claim. (Cl. 144—291)

This invention relates to clamping means, and more particularly to a clamp unit which is particularly adapted for miter clamping.

An object of the invention is to provide a clamp unit for association with other similar units for providing a highly effective miter clamp comprising a minimum number of component parts.

Another object of the invention is to provide a miter clamp which comprises four similar L-shaped clamping blocks adjacent ones of which are interconnected by means of elongate tension elements by means of which the individual clamping blocks are urged toward one another for applying a clamping force.

A further object of the invention is to provide a clamp unit which includes a substantially L-shaped body portion to one leg of which a tension member is normally anchored, said tension member being adapted to receive an abutment which is carried by and shiftable along said element; the other leg is provided with a through bore dimensioned to slidably receive the tension element of a similar unit.

Another object of the invention is to provide a miter clamp the various component parts of which are rugged, of simple design, inexpensive, yet durable, and which will effectively, efficiently, automatically and individually square the respective corners engaged thereby.

Still another object of the invention is to provide a miter clamp having the hereinabove described characteristics, which may be quickly adapted for a great variety of different sizes by merely substituting various length tension members.

These and other objects are attained by the means described herein and as disclosed in the accompanying drawings, in which:

Fig. 1 is a plan view of the component parts of four sets of clamp units from which a typical miter clamp may be assembled.

Fig. 2 is an elevational view of the rear end of a clamp block comprising a detail of the present invention.

Fig. 3 is an elevational view of the right side of the clamp block of Fig. 2.

Fig. 4 is a sectional view taken on line 4—4 of Fig. 2.

Fig. 5 is an elevational view of the right or forward end of the block of Fig. 3.

Fig. 6 is an elevational view of the bottom of the block of Fig. 3.

Fig. 7 is an elevational view of the top of the block of Fig. 3.

Fig. 9 is an end elevation of Fig. 8.

Fig. 13 is a plan view of a modified form of clamp block embodying the teachings of the present invention.

Figure 8:
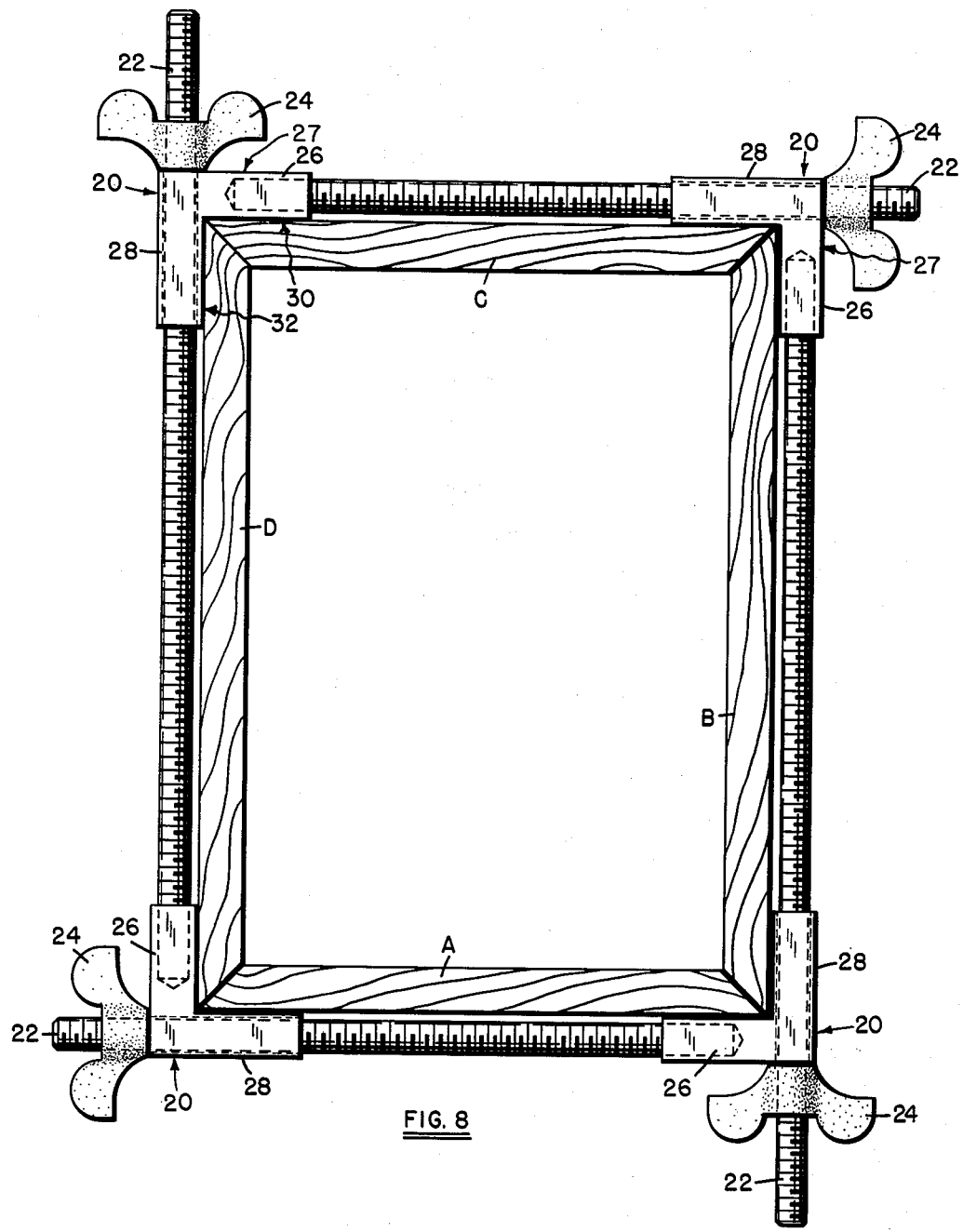
Fig. 8 is a plan view of a miter clamp embodying the teachings of the present invention operatively associated with the side rails of a rectangular frame.

With particular reference now to the drawings, the numeral 20 denotes generally a clamp block, the numerals 22 an elongate tension element, and the numerals 24 an abutment or tension applying means adapted to engage and be shifted along an element 22.

As best illustrated in Figs. 3 and 4, the clamp block comprises a substantially L-shaped body portion comprising a pair of legs 26 and 28 at right angles to one another. Each of the legs is provided with flat inner surfaces which define a pair of perpendicular intersecting, work-engaging surfaces 30 and 32.

Leg 26 is provided with a socket 34 the axis of which is in substantial parallelism with work-engaging surface 30. In the preferred embodiment of the invention, socket 34 is internally threaded, as best illustrated in Fig. 4.

Leg 28 includes an outer face 27, an inner end 29 and is provided with a through bore 36, the axis of said bore being in substantial parallelism with work-engaging surface 32. The axes of socket 34 and through bore 36 are located in a common plane, said axes being at substantial right angles.

Socket 34 is dimensioned to securely though releasably receive one end of a tension element 22 for thereby securely though releasably anchoring the tension element to and projecting from leg 26.

Bore 36 of leg 28 is dimensioned to slidably receive the tension element 22 of a similar clamp unit.

With particular reference now to Figs. 8 through 11, it will be noted that the various component parts illustrated in Fig. 1 may be interconnected whereby to provide four sets of individual clamp units, wherein the tension element 22 of each unit projects through the bore of a similar unit. Abutments 24 threadably engage those portions of their respective tension elements for contacting the outer face 27 of that particular clamp block through which the tension element slidably projects. By turning abutments 24 upon their respective tension elements, the corner members or clamp blocks 20 will be urged along the tension element toward that particular corner member to which the element is anchored. In this manner the mitered corners of a typical frame comprising side rails A, B, C and D may be conveniently clamped.

Figure 10:
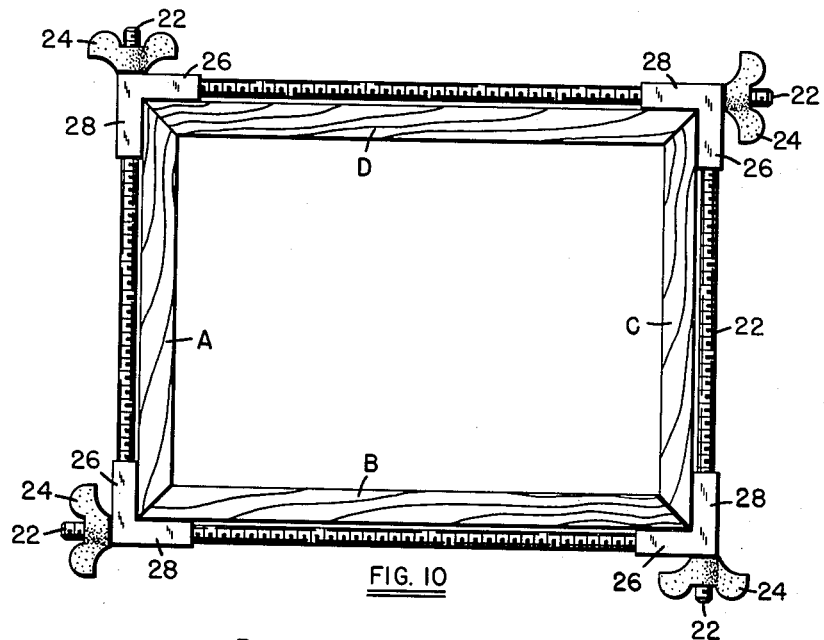
Figs. 10 and 11 are plan views of the miter clamp of Fig. 8 applied to different sized frames for illustrating the extreme versatility of the subject clamp.
Figure 11:
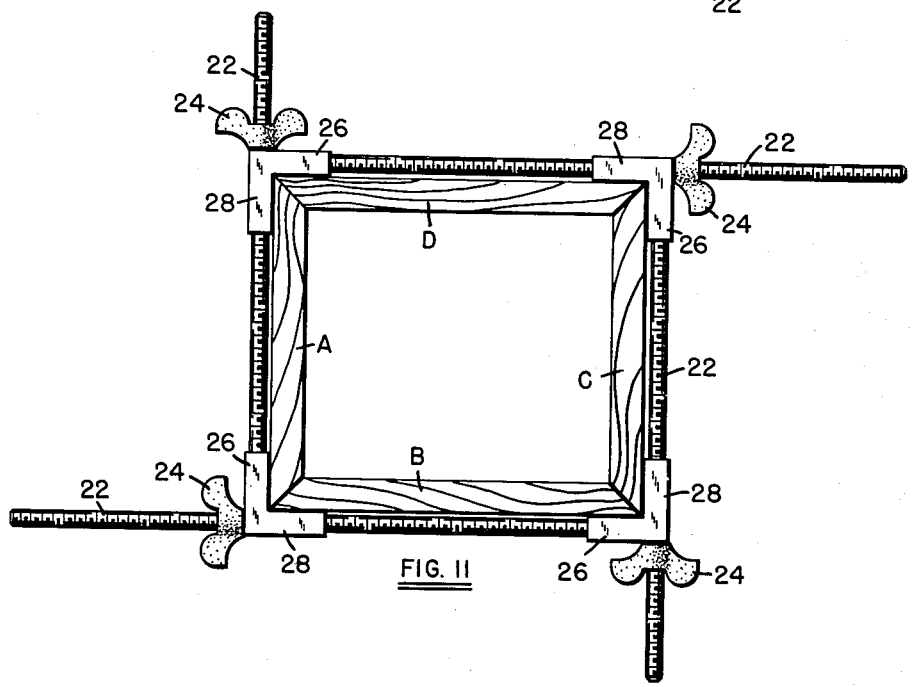

As best illustrated by a comparison of Figs. 10 and 11, the same set of clamp blocks or corner members and their associated tension elements 22 and tightening means 24 may be utilized for clamping frames which vary considerably in size, thereby indicating the extreme flexibility of my clamp. It should likewise be noted that by merely substituting tension elements of other lengths for those illustrated, the same set of corner blocks 20 and abutments 24 may be utilized for providing a miter clamp of any desired size.

Figure 12:
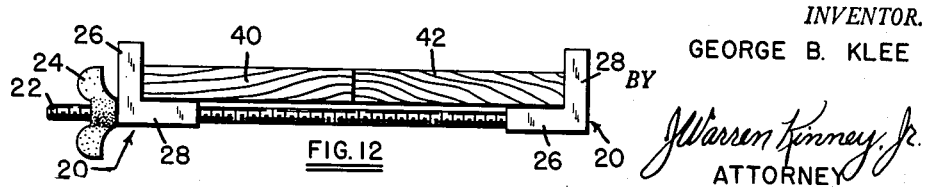
Fig. 12 is an end elevation of a pair of clamp units embodying the teachings of the present invention assembled to apply axial pressure to a pair of panels being joined in end-to-end relationship.

With reference to Fig. 12, it will be noted that my clamping blocks may likewise be utilized for effecting end-to-end joining of members such as panels 40 and 42.

Preferably, though not necessarily, the body portion of the clamp blocks may be undercut as at 50, note Fig. 13, in a plane at substantial right angles with the common plane through the through-bore and socket provided in legs 26 and 28 thereof, said undercut serving to preclude physical intersection of work-engaging surfaces 30 and 32. By means of such an undercut corners of a pair of mitered elements 52 and 54 are not confined, as clearly evident from an inspection of Fig. 13. Experience has indicated that the use of such undercut clamping blocks is highly desirable in those instances wherein the clamps are utilized in clamping plastic items.

While I prefer to releasably anchor one end of each tension element to leg 26 of a clamp block or corner member 20, my invention also includes and comprehends the fixed or permanent anchoring of a tension element thereto.

It should be understood that various changes and modifications may be made, within the scope of the appended claim, without departing from the spirit of the invention.

What is claimed is:

A work clamp comprising a plurality of identical L-shaped corner members, each of said corner members comprising a substantially L-shaped body portion including a pair of legs disposed at right angles to one another, a pair of perpendicular work engaging surfaces, one of said surfaces being formed on each of said legs, one of said legs being configured to form a longitudinal bore extending completely therethrough, the other of said legs having a longitudinal threaded socket formed therein in the plane of and at right angles to said bore, a plurality of elongated threaded rods interconnecting said corner members, each of said rods threadably engaging the socket formed in one of said corner members, the other end of each rod being disposed through a bore formed in another of said corner member with a portion of the rod projecting beyond said bore, and a tightening member threadably engaging the portion of each of said rods projecting beyond the bore.

References Cited in the file of this patent

UNITED STATES PATENTS

| | | |
|---|---|---|
| 875,219 | Scammell | Dec. 31, 1907 |
| 1,000,212 | Trimble | Aug. 8, 1911 |
| 1,359,597 | Holman | Nov. 23, 1920 |
| 2,619,136 | Nash | Nov. 25, 1952 |

FOREIGN PATENTS

| | | |
|---|---|---|
| 518,793 | Great Britain | Mar. 7, 1940 |